3,598,796
CYCLOPENTENE POLYMER PRODUCTION
Karl Nützel, Opladen, Friedrich Haas, Cologne-Buchheim, Karl Dinges, Odenthal, and Wilhelm Graulich, Bergisch-Neukirchen, Germany, assignors to Farbenfabriken Bayer Aktiengesellschaft, Leverkusen, Germany
No Drawing. Filed Feb. 7, 1969, Ser. No. 797,677
Claims priority, application Germany, Feb. 24, 1968,
P 17 20 791.9
Int. Cl. C08f 5/00, 15/04
U.S. Cl. 260—88.2
4 Claims

ABSTRACT OF THE DISCLOSURE

Production of polymers of cyclopentene in solvent solution by the addition of catalyst components comprising tungsten hexachloride, cyclopentene-hydroperoxide and aluminum alkyl or aluminum alkyl halide, said aluminum alkyl or aluminum alkyl halide being added after the additions of tungsten hexachloride and cyclopentene-2-hydroperoxide and following a change in solvent solution color.

---

It is known that a linear unsaturated polymer with the structure of a polypentenamer can be obtained by polymerising cyclopentene with a catalyst consisting of tungsten hexachloride, an aluminium alkyl and a compound with oxygen-oxygen or oxygen-hydrogen bonds. Although this reaction may be carried out either in the presence or in the absence of solvents, considerably better results, and in particular much higher yields, are obtained by operating in the absence of solvents (cf. British patent specification No. 1,010,860).

The present invention relates to an improvement in this process. First of all, it is desirable, for various technical reasons, to conduct the polymerisation reaction in a solvent. Any polymerisation reaction is more readily controlled in the presence of solvents. Gel formation, which involves time-consuming purification stages, can be avoided in addition to which the requirements which the purity of the monomers has to satisfy are not as severe. Hitherto, however, certain disadvantages, including a totally inadequate yield and reaction velocity, have prevented polymerisation from being carried out in solvents on a commercial scale. In other words, it has not yet been possible to conduct the polymerisation process in question in solution on a commercial scale.

It has now been found that the polymerisation reaction can be carried out in solution providing the following requirements are satisfied:

(1) The tungsten hexachloride must be added to the cyclopentene solution at a temperature above 0° C. (and preferably at a temperature of from 0 to 30° C.) and a change of colour from blue or greenish-blue to red-brown must be awaited.

(2) The oxygen-containing compound must be cyclopentene-2-hydroperoxide. Surprisingly, there is no reduction in the content of trans-bonds in the polymer when cyclopentene-2-hydroperoxide is used.

(3) The cyclopentene peroxide may be added either before or after the tungsten hexachloride, but only before the aluminium trialkyl.

(4) The aluminium trialkyl or an aluminium alkyl halide is added at a temperature from +30° C. to −30° C., generally at a temperature of about 0° C.

By adopting this procedure, a polymerisation yield in excess of 80% is obtained within one hour in the solution polymerisation of cyclopentene.

This procedure may also be used for the copolymerisation of cyclopentene with other olefins, for example bicyclic olefins, preferably with a molecular weight of from 93 to 132, such as dicyclopentadiene, norbornadiene, norbornene, cyclo-octadiene, bicyclo-2-octene and others. In this embodiment, the comonomer is generally used in quantities of no more than 30% by weight and preferably no less than 1% by weight, based on cyclopentene.

Compared with a polypentenamer, the copolymers of cyclopentene and dicyclopentadiene obtained in accordance with the present invention have the following additional bands in the infra-red spectrum: 3030 cm.$^{-1}$; 1440 cm.$^{-1}$; 1358 cm.$^{-1}$; 1280 cm.$^{-1}$; and 730 cm.$^{-1}$.

The polymers and the copolymers obtained in accordance with the present invention preferably have a predominantly trans-structure.

The catalyst components are normally used in quantities within the following limits: tungsten hexachloride: 0.05 to 5% by weight, based on cyclopentene; cyclopentene-2-hydro peroxide: 0.1 to 1 mol per mol of WCl$_6$; aluminium alkyl: 0.5 to 5 mol per mol of tungsten hexachloride.

Accordingly, the novel process may be defined as follows: A process for the production of polymers and copolymers of cyclopentene in solution with a mixed catalyst of tungsten hexachloride, an aluminium alkyl or aluminium alkyl halide and an oxygen-containing compound, in which the tungsten hexachloride is initially added to the polymerisation solution consisting of solvent and cyclopentene, optionally along with other monomers, at a temperature above 0° C. and the solution is left standing until it undergoes a change in colour to red to reddish-brown, after which the aluminium alkyl or aluminium alkyl halide is added, either before or after the oxygen-containing compound, at a temperature of from +30 to −30° C., cyclopentene-2-hydroperoxide is used as the oxygen-containing compound, and the resulting polymer is isolated from the solution.

A possible theoretical explanation for the surprising and complete nature of the polymerisation reaction is as follows: When the tungsten hexachloride is added to the solution of the cyclopentene, a green to blue-coloured solution is initially formed. At temperatures above 0° C., for example at room temperature, this solution rapidly changes colour into a red to reddish-brown solution. A complex compound of tungsten hexachloride and 2 mols of cyclopentene is formed in the solution, its presence being indicated by a weakly exothermic reaction when the progress of the reaction is followed by calorimetry. This complex compound is the actual catalyst component. If the formation of this complex is inhibited by adding the tungsten hexachloride at low temperatures, its catalytic activity is reduced to a fraction. It was also found that, in comparison with other oxides, cyclopentene-2-hydro peroxide used as activator, particularly in conjunction with the aforementioned complex salt, increases both the polymerisation yield and velocity very considerably without reducing the content of trans-bonds.

As a rule, the process is carried out by adding the catalyst components in the aforementioned sequence and at the above-mentioned temperatures to the solution of cyclopentene in an inert organic solvent. Precautions should be taken to exclude moisture and oxygen (inert gas atmosphere). Polymerisation is accompanied by a slight increase in the temperature of the solution. The polymer may be isolated from the solution by precipitation, for example with alcohols.

Aliphatic and aromatic hydrocarbons are particularly suitable solvents, aromatic hydrocarbons being preferred. Toluene or chlorinated benzenes are normally used as the solvents. Suitable aluminium trialkyls include compounds of the formula AlR$_3$ in which R represents alkyl groups with from 1 to 12 carbon atoms. The alkyl groups may be the same or different. For example, aluminium triethyl, aluminium tributyl and, preferably, aluminium triisobutyl may be used.

Suitable aluminium alkyl halides include compounds of the formula $AlR_{2-n}Hal_n$, in which R is as defined above, Hal represents a halogen atom (e.g. chlorine) and $n$ equals 1 or 2. Examples include aluminium diisobutyl chloride, aluminium diethyl chloride, and aluminium ethyl sesquichloride. The resulting polymers are elastomers.

The following examples are carried out with dry apparatus and with dry reagents in an atmosphere of pure nitrogen.

EXAMPLE 1

160 ml. of toluene and 60 ml. (46.5 g.) of cyclopentene are introduced into a 500 ml. capacity 3-necked flask equipped with a gas-tight stirrer, a thermometer and nitrogen inlet. 0.25 g. (0.63 mMol) of tungsten hexachloride are then added. The solution is left for about 5 minutes until it has undergone a complete change in colour from blue to red. 0.027 g. (0.27 mMol) of cyclopentene-2-hydroperoxide dissolved in cyclopentene are then added. The mixture is cooled to −8 to −10° C. and 0.168 g. (0.85 mMol) of aluminum triisobutyl are added. The solution undergoes a change in colour to black-brown-red and immediately begins to turn viscous. The temperature is allowed to come to 0 to +2° C., after which the solution is again cooled to −10° C. After an interval of 1 hour, 10 cc. of methanol and 2 cc. of aminoethanol are added to the solution which is then homogenised by stirring, optionally following the addition of 100 ml. of toluene, after which the polymer is precipitated from a 5-fold excess of the solution in methanol. 1% of 3,3' - dimethyl - 5,5'-di-tert.-butyl-6,6'-dihydroxy diphenylmethane had been added to the methanol beforehand. After drying, 38 g. of a transparent elastomer are obtained. The yield thus amounts to 82%. The ealstomer has a limiting viscosity of 2.8 and a Mooney value ML-4 (100° C.) of 36. The cold flow is measured by means of an efflux plastometer and amount to 14.8 mg./min. (50° C.). The content of trans- and cis-bonds can be calculated by the known method for determining the content of 1,4-cis-and 1,4-trans-bonds in polybutadiene.

The polymer contains 93.8 trans-bonds, the remainder comprising cis-bonds. Ring structures are impossible to detect with any of the physical methods currently available.

(Comparison Example) EXAMPLE 2

The procedure described in Example 1 is repeated, the only difference being that the tungsten hexachloride in solution in toluene is added at −30° C. and not at room temperature. The aluminum triisobutyl is added without waiting for a change in colour from blue to red. After 1 hour, a yield of 6 g. or 13% was obtained.

(Comparison Example) EXAMPLE 3

The procedure described in Example 1 is repeated except that no cyclopentene-2-hydroperoxide is added. After 1 hour, the yield amounts to only 6% of the theoretical.

(Comparison Example) EXAMPLE 4

The procedure is an in Example 2 except that no cyclopentene-2-hydroperoxide is added. Even after an hour, no yield had been obtained.

EXAMPLE 5

The procedure is as described in Example 1 except that, instead of the cyclopentene-2-hydroperoxide, other peroxides and oxygen--containing compounds are added. The following table shows the amounts used and the results obtained.

TABLE

| Oxygen compound | Millimoles | G. | Percent Yield | Percent Trans-components |
| --- | --- | --- | --- | --- |
| Benzoylperoxide | 0.27 | 0.065 | 6 | 86.5 |
| Di-tert.-butylperoxide | 0.27 | 0.04 | 4 | 87.3 |
| Tert.-butylhydroperoxide | 0.27 | 0.024 | 8 | 88.2 |
| Cumylhydroperoxide | 0.27 | 0.027 | 8 | 87.6 |
| Tert.-butanol | 0.27 | 0.02 | 7 | 88.0 |
| Do | 2.7 | 0.2 | 6 | 86.6 |

EXAMPLE 6

The procedure is as described in Example 1 except that a mixture of 60 ml. of cyclopentene and 12 ml. of dicyclopentadiene is used instead of cyclopentene. The polymerization time is lengthened to 24 hours. A nonelastomeric polymer, which is only partly soluble, is obtained after working up. The yield comprises 75%, and the trans-content of the soluble component is 70%. A different infra-red spectrum is obtained because of the dicyclopentadiene incorporated.

EXAMPLE 7

2575 ml. of toluene, 900 ml. of cyclopentene and 17 ml. of dicyclopentadiene are introduced into a 4 litre-capacity 3-necked flask equipped with a stirrer, thermometer and nitrogen inlet. 0.5 g. (5 mMols) of cyclopentene-2- hydroperoxide are added to the cyclopentene. 3.0 g. (8.1 mMols) of tungsten hexachloride are dissolved in the mixture at room temperature. After an interval of 15 minutes, the mixture is cooled to −10° C. and 1.84 g. (9.2 mMols) of aluminum triisobutyl, dissolved in 10 cc. of toluene, are added. The polymerisation temperature is kept between 0 and −10° C. Polymerisation is stopped after 3 hours and the polymer is precipitated in methanol as described in Example 1.

557 g. or 80% of a copolymer with 91.5% trans-components, a Mooney value ML-4 of 38 and a cold flow of 3.2 mg./min., are obtained after drying.

EXAMPLE 8

Following the procedure of Example 7, copolymers with improved cold flow are prepared with the following comonomers:

| Comonomers | Percent Component | Yield | Cold flow, mg./min. | Trans-component |
| --- | --- | --- | --- | --- |
| Norbornylene | 15 | 58 | (1) | |
| Do | 2 | 68 | <1.0 | 89 |
| Norbornadiene | 2 | 30 | 2.7 | 89 |
| Cyclooctadiene | 2 | 28 | 3.8 | 91 |
| Bicyclo-2-octene | 15 | 28 | 2.7 | 88 |

[1] Cross-linked.

What is claimed is:

1. A process for producing a polymer of cyclopentene which comprises adding tungsten hexachloride to a solvent solution of cyclopentene at a temperature above 0° C., adding cyclopentene-2-hydroperoxide to said solvent solution either before or after adding said tungsten hexachloride thereto and, after said additions and a change in solvent solution color to red-brown, adding aluminum alkyl or aluminum alkyl halide to said solvent solution containing tungsten hexachloride and cyclopentene-2-hydroperoxide and subsequently recovering resulting polymer, there being added 0.5 to 5% by weight of tungsten hexachloride, based on the weight of said cyclopentene, 0.1 to 1 mol of cyclopentene-2-hydroperoxide per mol of tungsten hexachloride and 0.5 to 5 mol of aluminum alkyl or aluminum alkyl halide per mol of tungsten hexachloride.

2. The process of claim 1 wherein said cyclopentene-2-hydroperoxide is added to said solvent solution prior to the addition of said tungsten hexachloride thereto.

3. The process of claim 1 wherein said tungsten hexachloride is added to said solvent solution prior to the addition of said cyclopentene-2-hydroperoxide thereto.

4. The process of claim 1 wherein a bicyclic olefin having a molecular weight of from 93 to 132 is present in said solvent solution as a comonomer for said cyclopentene.

References Cited

UNITED STATES PATENTS

| | | | |
|---|---|---|---|
| 3,287,327 | 11/1966 | Zutty | 260—78.5 |
| 3,449,310 | 6/1969 | Dall, Asta et al. | 260—93.1 |

JAMES A. SEIDLECK, Primary Examiner

R. A. GAITHER, Assistant Examiner

U.S. Cl. X.R.

260—93.1